United States Patent

[11] 3,607,071

| [72] | Inventors | Herbert Kenneth Staffin<br>Colonia;<br>Roy J. Ricci, Red Bank, both of N.J. |
|---|---|---|
| [21] | Appl. No. | 21,884 |
| [22] | Filed | Mar. 23, 1970 |
| [45] | Patented | Sept. 21, 1971 |
| [73] | Assignee | Procedyne Corporation<br>New Brunswick, N.J. |

[54] CONTINUOUS TOTAL ORGANIC CARBON ANALYZER AND METHOD
14 Claims, 4 Drawing Figs.

[52] U.S. Cl. .................................................. 23/230 PC,
23/153 PC
[51] Int. Cl. ................................................... G01n 31/12
[50] Field of Search ............................................ 23/230 PC,
253 PC, 230 US, 253 US; 250/43.5 US

[56] References Cited
UNITED STATES PATENTS

| 3,137,543 | 6/1964 | Barton et al. ................. | 23/230 |
| 3,224,837 | 12/1965 | Moyat ........................... | 23/230 PC |
| 3,296,435 | 1/1967 | Teal et al. ..................... | 23/230 PC X |
| 3,462,246 | 8/1969 | Copeland ...................... | 23/284 |

OTHER REFERENCES

Hall et al., Analytical Chemistry, Vol. 37, No. 6, pages 769-771 (May, 1965).

*Primary Examiner*—Joseph Scovronek
*Attorney*—Leonard S. Knox

ABSTRACT: Apparatus and method for receiving and analyzing a continuous stream constituting a sample of water or other fluid containing carbon-based organic and inorganic pollutants to determine the total content of pollutants in terms of carbon, and providing an instantaneous record of such content.

CONTINUOUS TOTAL ORGANIC CARBON ANALYZER AND METHOD

BACKGROUND OF THE INVENTION

The determination of total carbon in water offers a means of measuring the pollution level in aqueous systems in terms of the organic and inorganic matter therein. The dissolved organic matter derived from man's activities are usually the result of domestic and industrial wastes which enter lakes or streams and contaminate the water supply, whereby the quality of the water is impaired and its use restricted. Unacceptable tastes and odors can result from organic pollutants as well as naturally occurring compounds. Among these are phenols, esters, aldehydes, aliphatic and aromatic hydrocarbons, ketones, amines and sulfur compounds. Many other pollutants could be mentioned.

A tentative method for determining the amount of organic carbon in water has been published in the book of ASTM Standards, 1968, Part 23, 836, American Society for Testing and Materials. A number of commercial instruments are available for automatic analysis of total carbon. However manual pretreatment of the sample is necessary. Irrespective of their form or method of operation, all of them are restricted in one or more of the following respects:

1. Total carbon, not organic carbon, is determined.
2. Analysis of organic carbon requires manual pretreatment of the sample.
3. Two discrete injections of the sample are required for total carbon and inorganic carbon concentrations. Organic carbon is then estimated by difference.
4. Nonuniform sensitivity to varying organic compounds.

In view of the foregoing deficiencies the present invention has for its principal object the provision of apparatus and a method for continuously analyzing organic carbon contained in a fluid medium, which is automatic and functions continuously without requiring manual pretreatment of a sample.

Another object lies in apparatus which is free from complications and is standard in many of its components thereby reducing maintenance problems to a minimum.

SUMMARY OF THE INVENTION

The present invention concerns the continuous measurement of the concentration of organic carbon in a sample stream without manual pretreatment or manipulation. The apparatus, sometimes referred to for brevity as a TOC monitor, i.e., total organic carbon monitor, comprises three sections:

1. A sample pretreatment system which efficiently removes inorganic carbon present in the effluent stream,
2. An oxidation system which converts the organic carbon into $CO_2$,
3. An infrared analyzer to measure quantitatively $CO_2$ which is proportional to the TOC in the system.

Broadly regarded, the system comprises a reservoir holding a quantity of effluent at a constant head. An outlet from the reservoir feeds the sample to a tank whereat it is treated with hydrochloric acid to shift the equilibria of the carbonates prior to feeding the acidified sample to a nitrogen sparge column. This latter is essentially a countercurrent, multistage gas stripper, wherein $CO_2$ is removed from the sample to result in an effluent virtually free of inorganic carbon and containing no dissolved $CO_2$.

The carbonate-free sample is delivered at some predetermined nominal rate, by means of a positive displacement metering pump, into a fluidized bed reactor. The reactor consists of a bed of aluminum oxide or equivalent particles which is heated and caused to behave analogously to a fluid by forcing a gas therethrough. A reactor of this type is disclosed in U.S. Pat. No. 3,350,915, granted on Nov. 7, 1967 and owned by the assignee of this application. Oxygen is supplied to the reactor at some multiple, e.g. 10 times, the stoichiometric requirement to oxidize the maximum amount of TOC which may be present. In the present disclosure, the gas which serves to fluidize the bed comprises the input of oxygen and the products of vaporization and combustion of the sample. The effluent of the reactor is a stream of water, $CO_2$ and $O_2$, plus oxidation products of other noncarbonaceous compounds present in the water sample.

The effluent from the reactor is cooled and the major part of the water removed in a condenser prior to entering a nondispersive infrared analyzer for $CO_2$ analysis. $CO_2$, as thus measured, is proportional to the TOC in the sample stream within certain error limitations now to be set forth.

It is to be noted that the steps of oxidation and analysis of the $CO_2$ portion of the process is essentially a continuous version of the rapid combustion method for the Determination of Organic Substances in Aqueous Solutions, Analytical Chemistry, 37, No. 6, 769 (1965). However, the present invention departs from prior methods in the continuous aspects of the pretreatment and oxidation steps and in the substantial rate of flow of the sample attainable by the use of the fluidized bed reactor.

DESCRIPTION OF THE PREFERRED EMBODIMENT

PRETREATMENT SUBSYSTEM

Figure 1:
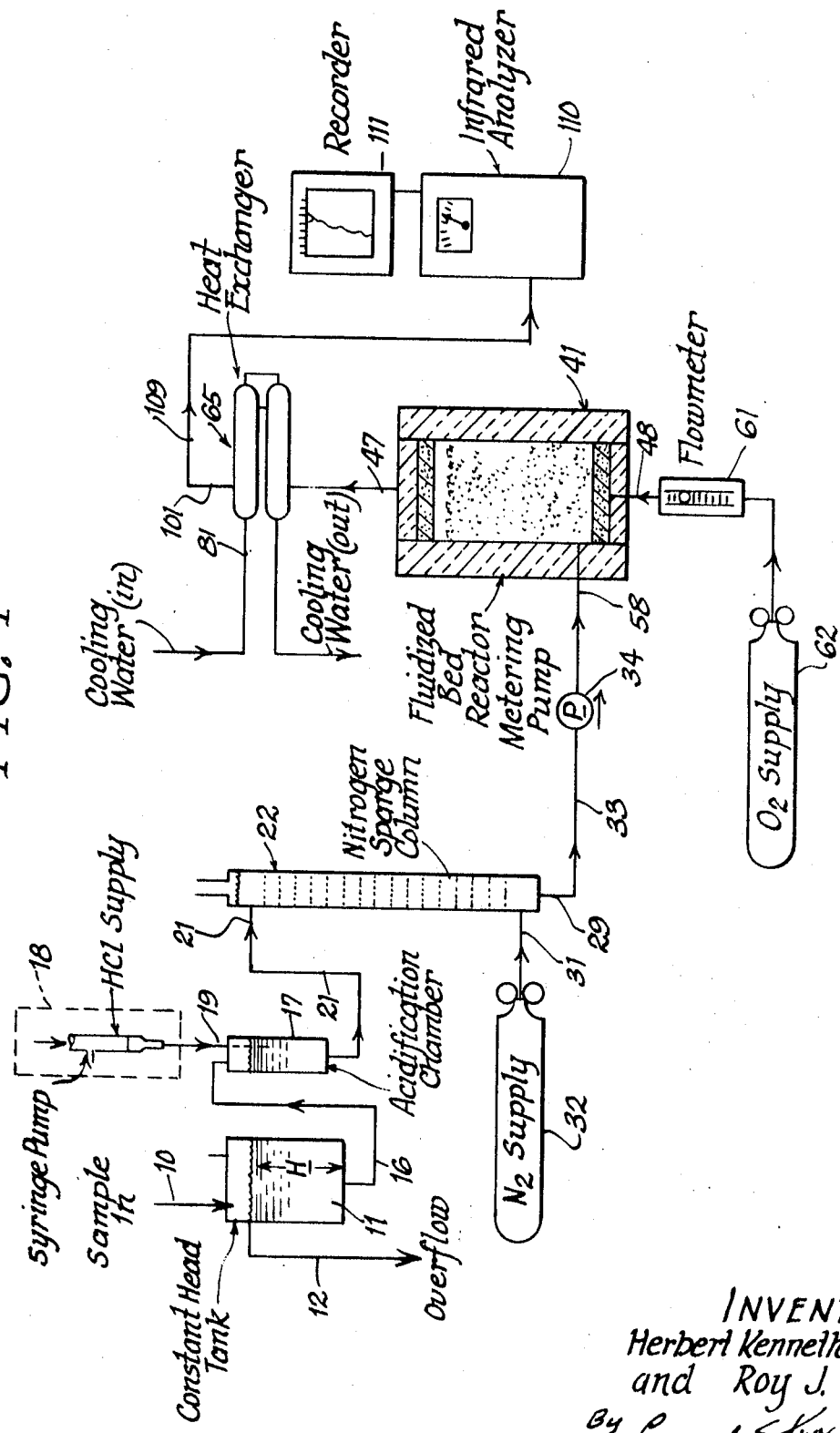
FIG. 1 is a schematic representation of the complete system showing the flow path.

The subsystem for pretreatment of the sample is designed to remove inorganic carbon (as carbonates) by automating the well-known manual method previously developed. (See Van Hall, Barth and Stenger, Elimination of Carbonates form Aqueous Solutions Prior to Organic Carbon Determinations, Analytical Chemistry, 37, No. 6, 769 (1965)). This method consists in acidifying the sample to a pH of between 2 and 3 with HCl and purging the acidified sample with an inert gas to remove the resulting $CO_2$. Within the present disclosure, this operation is performed on the continuous 3cc./min., sample in such a way that the errors introduced by dilution due to the addition of acid and residual $CO_2$ in the treated sample represent less than 1 percent error in the overall performance of the system. This error criterion applies for the system operating on a 100 mg./l. (or larger) TOC fullscale range with a maximum concentration of carbonate (as $CaCO_3$) in the original sample of less than 400 mg./l.

The desired acidification is obtained by introducing $50\mu l./min.$, of 0.5N HCl into the sample stream. Assuming that the sample stream has a nominal pH of 7 or less, it is easily shown that the resulting stream will have a pH of approximately 2 for the stated conditions. Obviously the acid stream of $50\mu l./min.$ does not represent a significant dilution factor in the sample stream of 3 ml./min.

In prototype systems three acid delivery systems have been successfully used. These include: (1) a syringe pump, (2) a gravity feed from a constant head reservoir, and (3) a pressurized capillary system. The sample and acid streams are mixed in a separate vessel of in the upper part of the sparge column which is designed to allow ample time for the reaction.

The sparge column (FIG. 2) is a miniature mass-transfer device serving to remove all but a negligible quantity of the $CO_2$ resulting from 400 mg./l., carbonates with a maximum nitrogen flow of 60 cc./min. and will be described subsequently. Under the stated conditions, the water sample exiting from the column will contain less than 2 mg./l. of $CO_2$ when the ambient temperature is in the range of 10° C to 50° C. This level represents an error of less than 0.7 percent in the measured TOC for samples containing 100 mg./l., actual TOC.

The entire system is interconnected in such a way that the minimum opening through which the sample flows corresponds to the usable area of the screens of the sparge column. For samples containing particulate matter approaching 10 mesh, an in-line blender is introduced to homogenize the sample.

OXIDATION SUBSYSTEM

The oxidation subsystem comprises a fluid bed reactor embodying the principles mentioned above and is so designed as to completely oxidize samples containing up to 4,000 mg./l., TOC at the predetermined rate of flow. The interior is provided with internal baffles to distribute the gases throughout the bed and insure adequate residence time for complete oxidation. Aluminum oxide, as particles, serves the dual function of providing the excellent heat transfer properties of a fluidized-solids bed and an abundant catalytic oxidation surface. It is these properties which allow for a large rate of flow of the sample using a reactor of reasonable dimensions.

Heat is applied to the bed by electric resistance heating elements and the temperature is controlled with any well-known controller and sensor. All components likely to be in contact with reacting substances are of stainless steel and alloys of nickel to preclude corrosion in the presence of chlorides and contamination of any of the streams.

In order to condense water vapor in the gas stream, a heat exchanger is provided at the reactor output. In the example the exchanger comprises concentric tubes to cool the gas stream to a temperature lower than the range within which the cell of the infrared analyzer is regulated (typically 50° C. to 55° C). Condensation in the cell is thus precluded.

With the oxygen rate adjusted at 10 times the stoichiometric requirement to oxidize the maximum TOC present, the $CO_2$ content in the effluent gas stream will be 10 percent of the total stream provided oxidation products of other noncarbonaceous compounds are absent. In the example, the system was operated for a fullscale range of 1,000 mg./l., TOC with a sample flow rate of 3 cc./min. These parameters dictate and oxygen rate of 57 cc./min.

The effluent gas may be analyzed with a conventional infrared analyzer having a range of 0 to 10 percent $CO_2$, and is monitored and/or recorded by any suitable means.

In evaluation runs both sodium acetate and potassium acid phthalate were used as the source of TOC, and sodium carbonate as the source of background inorganic carbon.

Performance of the pretreatment subsystem was evaluated in terms of residual $CO_2$ in effluent water from the sparge column and under different concentrations of the carbonate and various operating conditions. One liter samples containing up to 400 mg./l. of carbonate (as sodium carbonate) were drawn through the acidification and sparge stages by a metering pump. The samples were collected in glass bottles and analyzed for $CO_2$ by the usual method of sodium hydroxide scrubbing followed by titration with 0.1 N HCl to a pH of 4.5.

The best results were obtained with a syringe pump and a pressurized acid delivery system. For example, with a sample flow rate of 3 ml./min., of 400 mg./l. of $Na_2CO_3$ acidified with 50µl./min. of 0.5N HCl and sparged with nitrogen at 60 cc./min., the $CO_2$ measured was consistently less than 1.5 mg./l. This amount of $CO_2$ corresponds to less than 0.5 mg./l. equivalent TOC.

Performance of the overall system was with the system parameters adjusted for 1,000 mg./l. and 2,000 mg./l. TOC full scale on a 0 to 10 percent $Co_2$ analyzer. Results for operation on the 1,000 mg./l., range are presented in table I for the following operating conditions:

| | |
|---|---|
| Sample flow rate | 3.2 l./min. |
| $N_2$ sparge rate | 60 cc./min. |
| $O_2$ rate to reactor | 60 cc./min. |
| Reactor Temperature | 1,600° F. |
| TOC Source' | potassium acid phthalate |
| Carbonates ($Na_2CO_3$) | 0 and 400 mg./l., No measurable difference in output |

| Readout | 0 to 10% $CO_2$ Infrared analyzer with 0 to 100 mv. recorder |
|---|---|

TABLE I

| Sample TOC (Mg./l.) | $CO_2$ Calculated (Theo.) (%) | Output $CO_2$ Measured (%) | Recorder (Mv) |
|---|---|---|---|
| 0 | 0 | 0 | 0 |
| 200 | 2.0 | 2.09 | 22.7 |
| 400 | 4.0 | 4.14 | 45.0 |
| 600 | 6.0 | 6.16 | 67.0 |
| 800 | 8.0 | 7.98 | 86.77 |

DETAILED DESCRIPTION OF THE COMPONENTS

Adverting now to the drawings, a typical system embodying the principles of the invention is shown in FIG. 1. The sample is extracted at some nominal rage, e.g., 500 ml./min., from a conduit through which the polluted water is flowing and in a manner which will avoid the adverse effects of turbulence in order that the sample will be representative. The branch into which the sample flows is indicated at 10. The sample is delivered to a reservoir 11 provided with an overflow pipe 12 to insure a constant head H. The sample then flows, via a line 16, into the acidification chamber 17 where injection with acid, e.g., HCl, occurs. Since the sample is relatively small and the quantity of acid likewise small, it is preferred to use a syringe pump 18. Pumps of this type comprise essentially a hypodermic syringe, similar to those used in medical practice, and an electric motor which, through reduction gearing, drives the plunger at some adjustably predetermined, highly accurate, constant rate, whereby the delivery of acid may be reliably and consistently proportioned to the rate of flow of the sample. The syringe body is recharged at convenient intervals. The outlet of the syringe is connected to a suitable port 19 of the chamber 17. If desired acidification may be performed in the reservoir 11 and the chamber 17 eliminated.

Figure 2:
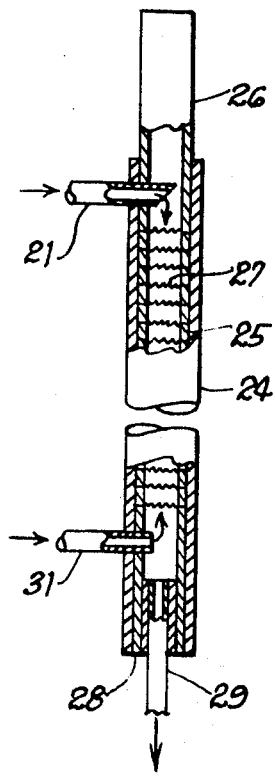
FIG. 2 is a vertical, medial cross section of the sparge column.

Following passage through the chamber 17, the sample is fed, via a line 21, to the sparge column 22, shown in detailed form in FIG. 2. The sparge column is designed to remove all but a negligible quantity of the $CO_2$ resulting from the 400 mg./l. carbonates with a maximum nitrogen flow of 60 cc./min. The column comprises a casing 24 having an inside diameter of 12 mm. and a height of 150 mm., housing a plurality of screens 27, say 20 or more, of 10-mesh stainless steel, spaced apart by rings 25. At the top is a vent 26 and, at the bottom, a hollow plug 28 receiving the outlet pipe 29. Nitrogen is caused to flow in countercurrent with the sample from a second inlet 31 connected to a supply at 32. The carbonate-free effluent leaving the sparge column at 29 is fed, via a line 33, to the metering pump P which delivers the sample at a constant rate, via a line 34 and port 58, into the fluidized bed reactor 41. The effluent water sample from the column will contain less than 2 mg./l., $CO_2$ for operation over an ambient temperature range of 10° C. to 50° C.

Figure 3:
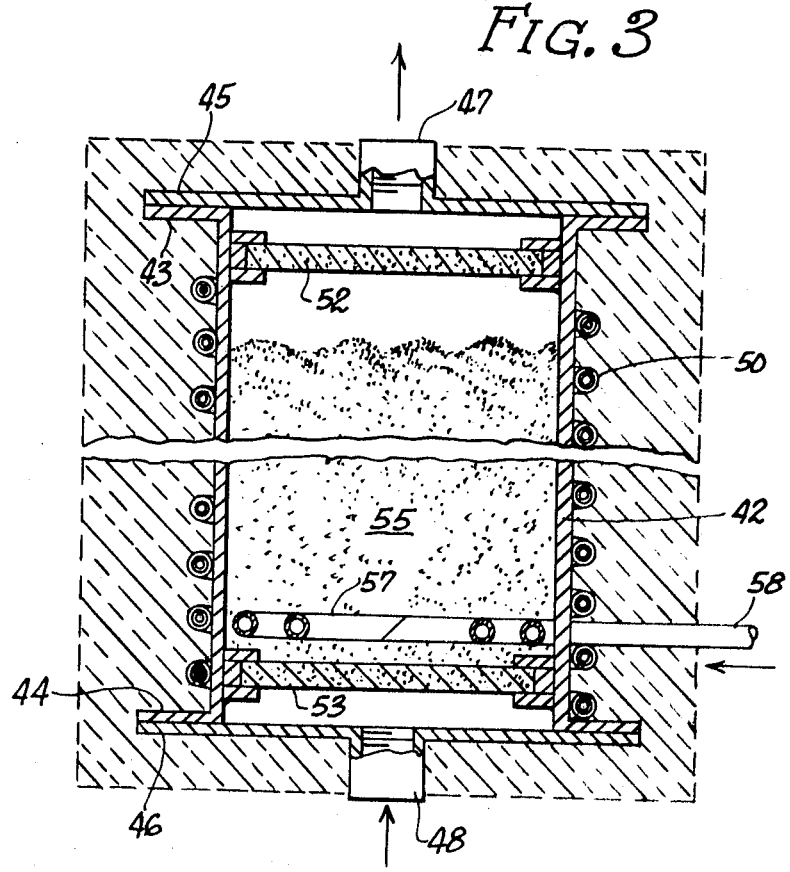
FIG. 3 is a vertical, medial cross section of the fluidized-solids bed reactor.

Referring to FIG. 3, the fluid bed reactor of the example comprises a cylindrical casing 42 approximately 75 mm. inside diameter and 200 mm. in length, having flanged ends 43 and 44 to which respective coverplates 45 and 46 are secured. These plates are fitted with respective ports 47 and 48. Near the upper and lower ends, and within the casing 42, are porous discs 52 and 53, e.g., of a ceramic, to contain the mass of particulate material comprising the bed 55, e.g., 140 mesh aluminum oxide. Heat is supplied by a helical coil 50 of a sheathed, electric-resistance element, e.g., Calrod, and is controlled for a reactor temperature of 850° C.

Adjacent and above the disc 53 is a spirally formed tube 57 forming an extension of the sample inlet port 58. The tube 57 is desirably provided with holes through its wall to distribute the incoming sample uniformly to the bed. Oxygen for reaction within the bed is supplied to the port 48 via a flowmeter 61, from a source of supply 62. The flowmeter is adjustable and of any conventional type in order that the rate of flow of oxygen may be made proportional to the rate of flow of the sample, viz, adequate for complete reaction within the bed. The reactor is designed to completely oxidize samples containing up to 4,000 mg./1., TOC at the flow rate specified above.

Figure 4:
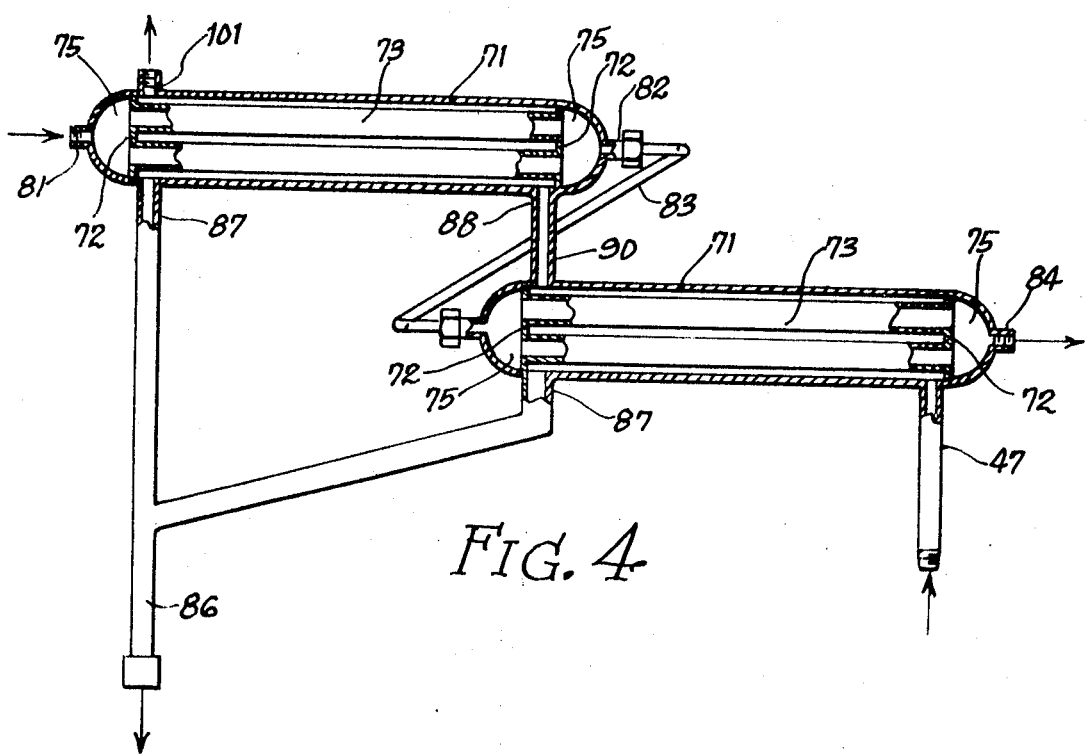
FIG. 4 is a combined cross section and elevation of the heat exchanger.

The heat exchanger 65 is shown in FIG. 4 and is of the two-stage type, each of which comprises a casing 71, a pair of headers 72—72 and a plurality of tubes 73 set into the headers. Adjacent each header 72 the casings 71—71 are formed to define spaces 75. Cooling water is admitted to the upper stage at 81, passes into the tubes 73 and exits through the port 82, then circulated through the lower stage, via pipe 83, in the same way as in the upper stage and the discharge emerges at port 84 to waste.

Water vapor in the gas stream generated in the reactor enters through pipe 47, flows through the spaces around the tubes 73 of the lower stage, thence through the pipe 90 into the spaces around the tubes 73 of the upper stage. This results in the condensation of most of the water vapor which exits as condensate at the ports 87—87 which merge into a common pipe 86. The effluent $CO_2$ and $O_2$ and remaining water vapor resulting from the heat-exchanging process leaves the exchanger at 101 and is at a temperature of less than 50° C. The gas effluent is delivered to the infrared analyzer 110 and recorder 111 via a pipe 109.

The method and apparatus described for monitoring TOC in aqueous solutions, essentially comprehend automatic analysis of a continuously flowing stream. The combustion technique for total carbon analysis preceded by pretreatment for removal of inorganic carbon associated with carbonates are well known. However, the instant invention is distinguished over the former methods in two significant respects, namely: the sample pretreatment is completely automatic and the measurement of TOC is continuous at relatively high sample rates.

The response time for the exemplificative system is approximately 20 minutes but, depending upon the components, it is anticipated that this time may be made 15 minutes or less. Such relatively short response time for the analysis of a continuous stream of 3 cc./min., assures adequate monitoring for most water and wastewater treatment systems. For this use it is desirable that the system be capable of operating unattended for long intervals. A system s described operated for seven days with 20 cu. ft. each of oxygen and nitrogen and 1 liter of 0.5N HCl. This operating time is based on a TOC range of 0 to 1,000 mg./l., for which 60 cc./min., of $O_2$ and $N_2$ are required for a sample flow rate of 3 ml./min.

We claim:

1. Apparatus for determining the total quantity of organic carbon as a pollutant in an aqueous stream in terms of $CO_2$, the determination being on a continuous basis in terms of weight of $CO_2$ per unit volume of flow of a sample taken from the stream comprising: a chamber into which the sample flows continuously at a predetermined volumetric rate, means to deliver an acid to the contents of the chamber at a predetermined volumetric rate proportional to the volumetric rate of flow of the sample to convert inorganic carbon contained in the sample to a salt, a sparge column to separate carbon dioxide from the sample, conduit means to transfer the sample from the chamber to the column, means to feed a gas to the column at a constant volumetric rate to effect such separation, a fluidized bed reactor to vaporize and oxidize the total organic carbon, conduit means to deliver the sample to the bottom of the reactor and means to feed oxygen to the bottom of the reactor bed, heat-exchange means to receive and cool the $CO_2$ output of the reactor and means for measuring the $CO_2$ content of the sample on a continuous basis.

2. Apparatus for determining the total quantity of organic carbon as a pollutant in an aqueous stream in terms of $CO_2$, the determination being on a continuous basis in terms of weight of $CO_2$ per unit volume of flow of a sample taken from the stream comprising: a reservoir into which the sample flows continuously, means to maintain a predetermined volume of the sample in the reservoir, and acidification chamber, conduit means providing communication between the reservoir and chamber for continuous delivery of the sample to the chamber means to deliver and acid to the contents of the chamber at a predetermined volumetric rate proportional to the volumetric rate of flow of the sample to convert inorganic compounds containing carbon contained in the sample to a salt, a sparge column to separate carbon dioxide from the sample, conduit means to transfer the sample from the chamber to the column, means to feed a gas to the column at a constant volumetric rate to effect such separation, a fluidized bed reactor to vaporize and oxidize the total organic carbon, conduit means to deliver the sample to the bottom the the reactor bed and means to feed oxygen to the bottom of the reactor bed, heat-exchange means to receive and cool the $CO_2$ output of the reactor and means for measuring the $CO_2$ content of the sample on a continuous basis.

3. Apparatus in accordance with claim 2 wherein said reservoir is provided with an overflow pipe to waste to maintain a constant head of the sample.

4. Apparatus in accordance with claim 1 in which the acid-delivery means is a positive displacement pump driven at a constant rate.

5. Apparatus in accordance with claim 1 in which the reactor comprises a casing, pulverulent refractory material contained in the casing and means to heat said material to the temperature of combustion of the organic carbon.

6. Apparatus in accordance with claim 1 wherein the sparge column is a countercurrent multistage gas stripper.

7. Apparatus in accordance with claim 1 in which the sparge column comprises a casing, a plurality of spaced screens supported within the casing, the means for feeding as to the casing provides for upward flow thereof and the means for delivering the sample to the casing provides for downward flow thereof, the casing being provided with a vent to dispose of the spent gas.

8. Apparatus in accordance with claim 1 in which the measuring means is an infrared analyzer sensitized to $CO_2$.

9. The method of measuring the total quantity of organic carbon continuously by analyzing a sample stream thereof flowing at a constant volumetric rate comprising the steps of:
    a. continuously delivering the stream at a constant volumetric rate to a chamber,
    b. maintaining a constant volume of the sample in the chamber,
    c. adding an acid to said volume at a predetermined constant rate and normality to convert inorganic compounds containing carbon in the sample to salts,
    d. stripping $CO_2$ from the sample to obtain an effluent virtually free of inorganic carbon,
    e. delivering the effluent at a predetermined volumetric rate to the bottom of bed of a fluidized bed reactor.
    f. concurrently feeding oxygen to the bottom of the bed of the reactor at some multiple of the stoichiometric requirement to completely oxidize the total organic carbon in the sample to carbon dioxide and
    g. measuring the content of carbon dioxide on a continuous basis.

10. The method of measuring the total quantity of organic carbon continuously by analyzing a sample stream thereof flowing at a constant volumetric rate comprising the steps of:
    a. continuously delivering the stream at a constant volumetric rate to a chamber,
    b. maintaining a constant volume of the sample in the chamber,
    c. adding an acid to said volume at a predetermined constant rate and normality to convert inorganics in the sample to salts,
    d. stripping $CO_2$ from the sample to obtain an effluent virtually free of inorganic carbon,
    e. delivering the effluent at a predetermined volumetric rate to the bottom of the bed of a fluidized bed reactor.

f. concurrently feeding oxygen to the bottom of the bed of the reactor at some multiple of the stoichiometric requirement to completely oxidize the total organic carbon in the sample to carbon dioxide and g. condensing most of the water vapor in the effluent, h. eliminating the water, i. measuring the content of carbon dioxide on a continuous basis.

11. Apparatus for determining the total quantity of organic carbon as a pollutant in an aqueous stream in terms of $CO_2$, the determination being on a continuous basis in terms of weight of $CO_2$ per unit volume of flow of a sample taken from the stream comprising: a reservoir to receive the sample continuously, the reservoir having an inlet for the sample and an outlet for exit of the effluent, means to maintain a predetermined volume of the sample in the reservoir, means to remove the inorganic carbon by continuous conversion to salts by contact with acid, means to gas-sparge the sample, bottom-fed fluidized reactor means to continuously convert the organic carbon to $CO_2$ by oxidation and means to measure the $CO_2$ quantitatively.

12. Apparatus in accordance with claim 11 wherein the inorganic carbon removing means includes means for supplying acid to the sample volume.

13. Apparatus in accordance with claim 12 further characterized by means to eliminate $CO_2$ resulting from the reaction in the sample volume.

14. Apparatus in accordance with claim 11 wherein said $CO_2$ eliminating means is a sparge column.

UNITED STATES PATENT OFFICE
CERTIFICATE OF CORRECTION

Patent No. 3,607,071      Dated September 21, 1971

Inventor(s) Herbert Kenneth Staffin et al.

It is certified that error appears in the above-identified patent and that said Letters Patent are hereby corrected as shown below:

Column 2, line 64, "of" should read -- or --. Column 3, line 39, "and" should read -- an --. Column 5, line 46, "s" should read -- as --; line 68, after "reactor" insert -- bed --; line 69, "he" should read -- the --. Column 6, claim 7, line 3, "as" should read -- gas --.

Signed and sealed this 1st day of August 1972.

(SEAL)
Attest:

EDWARD M. FLETCHER, JR.       ROBERT GOTTSCHALK
Attesting Officer      Commissioner of Patents